(12) United States Patent
Kobayashi et al.

(10) Patent No.: US 11,708,232 B2
(45) Date of Patent: Jul. 25, 2023

(54) STACKING APPARATUS AND STACKING METHOD

(71) Applicant: KABUSHIKI KAISHA TOSHIBA, Tokyo (JP)

(72) Inventors: Yuko Kobayashi, Kawasaki Kanagawa (JP); Misato Ishikawa, Kawasaki Kanagawa (JP); Shunsuke Hattori, Kawasaki Kanagawa (JP); Takamitsu Sunaoshi, Yokohama Kanagawa (JP); Takahiro Kokubo, Hiratsuka Kanagawa (JP); Noboru Nakamura, Chigasaki Kanagawa (JP); Masahito Kochiwa, Yokohama Kanagawa (JP); Hiroyuki Fukuyo, Ebina Kanagawa (JP); Kazuhiro Mukai, Yokohama Kanagawa (JP); Takeshi Yamagata, Yokohama Kanagawa (JP); Mitsuhiro Saitou, Saitama Saitama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 17/004,142

(22) Filed: Aug. 27, 2020

(65) Prior Publication Data

US 2021/0245982 A1    Aug. 12, 2021

(30) Foreign Application Priority Data

Feb. 10, 2020    (JP) .................................. 2020-020634

(51) Int. Cl.
*B65H 9/00*    (2006.01)
*B65H 7/14*    (2006.01)
(Continued)

(52) U.S. Cl.
CPC ................ *B65H 9/002* (2013.01); *B65H 7/14* (2013.01); *B65H 29/40* (2013.01); *B65H 29/62* (2013.01);
(Continued)

(58) Field of Classification Search
CPC ...................... B65H 2301/4454; B65H 39/06; B65H 29/62; B65H 29/40; B65H 2801/72; B65H 2404/661; H01M 10/0404; H01M 10/0463
See application file for complete search history.

(56) References Cited

U.S. PATENT DOCUMENTS 4,426,074 A * 1/1984 Fischer .................. B65H 29/66
271/302
4,696,464 A * 9/1987 Gammerler ........ B65H 29/6681
271/9.13
(Continued)

FOREIGN PATENT DOCUMENTS

JP   S53-85200 U    7/1978
JP   S62-136452 A    6/1987
(Continued)

*Primary Examiner* — Jeremy R Severson
(74) *Attorney, Agent, or Firm* — Finnegan, Henderson, Farabow, Garrett & Dunner, LLP

(57) ABSTRACT

According to an embodiment, a stacking apparatus includes: a first precedent-stage conveyor unit that conveys first sheets; a second precedent-stage conveyor unit that conveys second sheets; a merging unit that guides, to a merge point, the first sheets output from the first precedent-stage conveyor unit and guides, to the merge point, the second sheets output from the second precedent-stage conveyor unit; a subsequent-stage conveyor unit that sequentially receives, at the merge point, the conveyed first sheets and the conveyed second sheets, and conveys the received first sheets and the received second sheets in order of the reception while lining up in a conveying direction; and a stacking unit that sequen-
(Continued)

tially catches each of the first sheets and each of the second sheets and stacks, at a predetermined position, each of the first sheets and each of the second sheets in order of the catch.

11 Claims, 12 Drawing Sheets

(51) Int. Cl.
    *B65H 31/02*     (2006.01)
    *B65H 29/40*     (2006.01)
    *B65H 29/62*     (2006.01)

(52) U.S. Cl.
    CPC ..... *B65H 31/02* (2013.01); *B65H 2301/4454* (2013.01); *B65H 2406/34* (2013.01)

(56) References Cited

U.S. PATENT DOCUMENTS

| | | | |
|---|---|---|---|
| 7,665,721 B2 * | 2/2010 | Palamides | B65H 29/6681 |
| | | | 271/9.04 |
| 9,027,741 B2 * | 5/2015 | Galkin | B65H 5/224 |
| | | | 198/572 |
| 2011/0215524 A1 * | 9/2011 | Inoue | B65H 7/08 |
| | | | 271/228 |
| 2014/0013586 A1 | 1/2014 | Yuhara et al. | |
| 2014/0020239 A1 | 1/2014 | Yuhara et al. | |
| 2014/0027067 A1 | 1/2014 | Yuhara et al. | |

FOREIGN PATENT DOCUMENTS

| | | |
|---|---|---|
| JP | S63-27368 A | 2/1988 |
| JP | H2-300044 A | 12/1990 |
| JP | H6-56317 A | 3/1994 |
| JP | 2008-84170 A | 4/2008 |
| JP | 2012-240799 A | 12/2012 |
| JP | 5666805 B2 | 2/2015 |
| JP | 5814588 B2 | 11/2015 |
| JP | 5820138 B2 | 11/2015 |
| JP | 5901135 B2 | 4/2016 |
| JP | 5997877 B2 | 9/2016 |
| JP | 2017-7829 A | 1/2017 |
| WO | WO-0043307 A1 * | 7/2000 ............. B65H 29/40 |

* cited by examiner

STACKING APPARATUS AND STACKING METHOD

CROSS-REFERENCE TO RELATED APPLICATIONS

This application is based upon and claims the benefit of priority from Japanese Patent Application No. 2020-020634, filed on Feb. 10, 2020; the entire contents of which are incorporated herein by reference.

FIELD

Embodiments described herein relate generally to a stacking apparatus and a stacking method.

BACKGROUND

There are batteries of various types and forms. For example, there is a battery having a form in which a positive electrode and a negative electrode insulated from each other with a separator is wound into a coil shape, flattened into an elliptic shape, and sealed in a can having an oblong shape. In this form, however, there is a wasteful space between the elliptic battery and the can. Having been also developed is a laminated battery in which a combination of a positive electrode, a separator, a negative electrode, and another separator having a sheet-like (e.g., rectangular thin film-like) shape is laid in a plurality of layers, and housed in a can having an oblong shape. Such a laminated battery can reduce the wasteful space in the can. However, in the manufacture of a laminated battery, because handling of separators cut in a sheet-like shape is difficult, the process of stacking the electrodes and the separator by accurately aligning the separator between the positive electrode and the negative electrode is complex.

Having been disclosed is a method for manufacturing a laminated battery by manufacturing a bagged electrode in which one of the electrodes (for example, a positive electrode) of the battery is sandwiched between a pair of separators, and stacking the bagged electrode and the other electrode (e.g., a negative electrode) alternately in layers. Having been also known is a method for laminating the bagged electrode and the other electrode alternately in layers, using a pick-and-place machine that uses a rotating robot arm and a suction device at the tip.

For such a battery manufacturing method, speeding-up for improving the productivity in the battery production has been an important issue to be addressed.

DETAILED DESCRIPTION

According to an embodiment, a stacking apparatus includes a first precedent-stage conveyor unit, a second precedent-stage conveyor unit, a merging unit, a subsequent-stage conveyor unit, and a stacking unit. The first precedent-stage conveyor unit conveys one or more first sheets. The second precedent-stage conveyor unit conveys one or more second sheets. The merging unit guides, to a merge point, each of the first sheets output from the first precedent-stage conveyor unit and guides, to the merge point, each of the second sheets output from the second precedent-stage conveyor unit. The subsequent-stage conveyor unit sequentially receives, at the merge point, each of the first sheets and each of the second sheets conveyed by the first precedent-stage conveyor unit and the second precedent-stage conveyor unit, respectively, and conveys each of the first sheets and each of the second sheets in order of the reception while lining up in a conveying direction. The stacking unit sequentially catches each of the first sheets and each of the second sheets conveyed by the subsequent-stage conveyor unit, and stacks, at a predetermined position, each of the first sheets and each of the second sheets in order of the catch.

An embodiment of the present disclosure will now be explained in detail with reference to the appended drawings.

Figure 1:
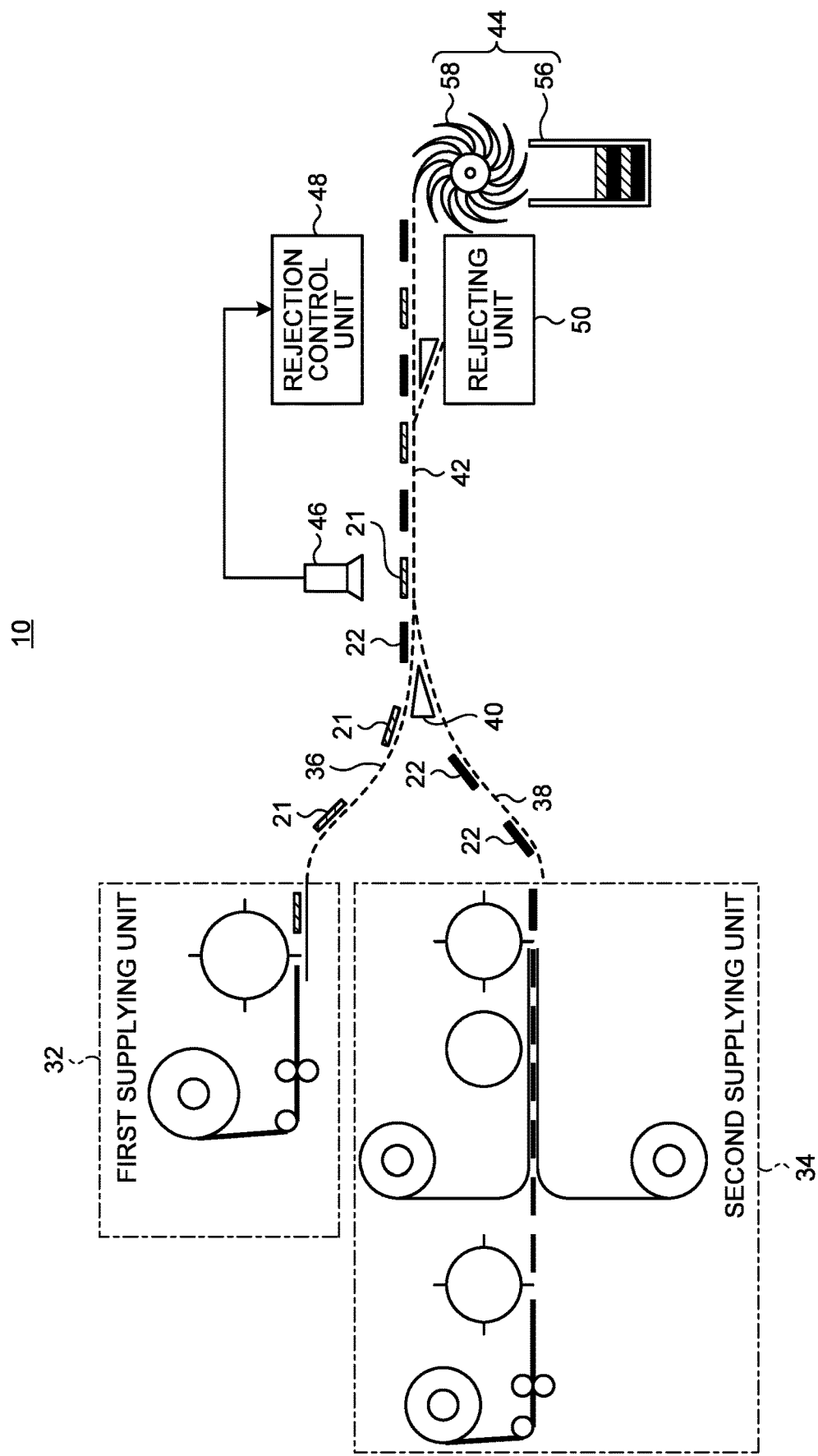
FIG. 1 is a schematic illustrating a structure of a stacking apparatus according to an embodiment.

FIG. 1 is a schematic illustrating a structure of a stacking apparatus 10 according to the embodiment. The stacking apparatus 10 is a device that stacks a plurality of types of sheets 20 in predetermined order. The sheet 20 is a thin film-like object. The material of the sheet 20 may be any material. The principal surface of the sheet 20 may have any shape.

In the present embodiment, the stacking apparatus 10 stacks a first sheet 21 and a second sheet 22 at a predetermined position. The first sheet 21 and the second sheet 22 is one example of the sheet 20. The first sheet 21 is a type of a sheet 20 different from the second sheet 22. The first sheet 21 and the second sheet 22 will be explained further in detail with reference to FIGS. 2, 3 and 4.

Without limitation to the alternating order, the stacking apparatus 10 may stack the first sheet 21 and the second sheet 22 in any order. For example, the stacking apparatus 10 may repeat a pattern of stacking two sheets of the first sheet 21 continuously, and then stacking one sheet of the second sheet 22. Furthermore, the stacking apparatus 10 may stack the sheets 20 of three or more types in predetermined order.

The stacking apparatus 10 includes a first supplying unit 32, a second supplying unit 34, a first precedent-stage conveyor unit 36, a second precedent-stage conveyor unit 38, a merging unit 40, a subsequent-stage conveyor unit 42, a stacking unit 44, a detecting unit 46, a rejection control unit 48, and a rejecting unit 50.

The first supplying unit 32 sequentially outputs the first sheets 21 one by one to the first precedent-stage conveyor unit 36. For example, the first supplying unit 32 sequentially forms the first sheets 21 one by one. Then, the first supplying unit 32 feeds, at predetermined timings, the formed sheets one by one to the first precedent-stage conveyor unit 36 in order of the formation of sheets.

The second supplying unit 34 sequentially outputs the second sheets 22 one by one to the second precedent-stage conveyor unit 38. For example, the second supplying unit 34 sequentially forms the second sheets 22 one by one. Then, the second supplying unit 34 feeds, at predetermined timings, the formed sheets one by one to the second precedent-stage conveyor unit 38 in order of the formation of sheets.

The first precedent-stage conveyor unit 36 sequentially receives, one by one, the first sheets 21 output from the first supplying unit 32 and conveys the received first sheets 21 in order of the reception. In the present embodiment, the first precedent-stage conveyor unit 36 is a sandwich-type belt conveyor device. The sandwich-type belt conveyor device is provided with two belt units positioned to face each other along the conveyance path. The sandwich-type belt conveyor device conveys the sheets 20 (the first sheet 21 and the second sheet 22) in the conveying direction by holding those sheets 20 between the two belt units.

The first precedent-stage conveyor unit 36 may be a suction belt conveyor device. The suction belt conveyor device is provided with a belt that is disposed in such a manner that part of the belt extends along a conveyance path. The suction belt conveyor device conveys the sheets 20 (the first sheet 21 and the second sheet 22) while sucking the sheets 20 (the first sheet 21 and the second sheet 22) on one surface of the belt.

The second precedent-stage conveyor unit 38 sequentially receives, one by one, the second sheets 22 output from the second supplying unit 34 and conveys the received second sheets 22 in order of the reception. In the present embodiment, the second precedent-stage conveyor unit 38 may be a sandwich-type belt conveyor device. Alternatively, the second precedent-stage conveyor unit 38 may be a suction belt conveyor device.

The merging unit 40 guides the first sheets 21 output from the first precedent-stage conveyor unit 36 to the merge point. In other words, the merging unit 40 guides the first sheets 21 such that the first sheets 21 output from the first precedent-stage conveyor unit 36 move to the merge point. The merging unit 40 may be a guide member including a first support surface that supports the first sheet 21 on one surface of the first sheet 21 in a range from a finish end of the first precedent-stage conveyor unit 36, at which the conveyance of the first sheet 21 is finished, to the merge point. The guide member may include a side wall for restricting the position of the first sheet 21 in the width direction such that the first sheet 21 does not become misaligned in the width direction (a direction perpendicular to the conveying direction).

The merging unit 40 also guides the second sheets 22 output from the second precedent-stage conveyor unit 38 to the merge point. In other words, the merging unit 40 guides the second sheets 22 such that that the second sheets 22 output from the second precedent-stage conveyor unit 38 move to the merge point. The merging unit 40 may be a guide member including a second support surface that supports the second sheet 22 on one surface of the second sheet 22 in a range from a finish end of the second precedent-stage conveyor unit 38, at which the conveyance of the second sheet 22 is finished, to the merge point. The guide member may include a side wall for restricting the position of the second sheet 22 in the width direction such that the second sheet 22 does not become misaligned in the width direction.

The subsequent-stage conveyor unit 42 sequentially receives, at the merge point, the first sheets 21 and the second sheets 22 conveyed by the first precedent-stage conveyor unit 36 and the second precedent-stage conveyor unit 38, respectively. Then, the subsequent-stage conveyor unit 42 conveys the first sheets 21 and the second sheets 22 in order of the reception while lining up in the conveying direction. In the present embodiment, the subsequent-stage conveyor unit 42 is a sandwich-type belt conveyor device. Alternatively, the subsequent-stage conveyor unit 42 may be a suction belt conveyor device.

The stacking unit 44 sequentially catches the first sheets 21 and the second sheets 22 conveyed by the subsequent-stage conveyor unit 42, and stacks the caught first sheets 21 and second sheets 22 at a predetermined position in order of the catch. The stacking unit 44 includes a housing unit 56 and an impeller 58, for example. The housing unit 56 has an internal space for housing the stacked first sheets 21 and second sheets 22.

The impeller 58 catches the first sheet 21 or the second sheet 22 between a vane and another vane at a finish end of the subsequent-stage conveyor unit 42. The impeller 58 rotates the first sheet 21 or the second sheet 22 while holding between the vanes, and moves the sheet to a release position above the housing unit 56. The impeller 58 releases the first sheet 21 or the second sheet 22 from the vanes and drops the sheet into the housing unit 56. By dropping the first sheet 21 or the second sheet 22 into the housing unit 56, the impeller 58 stacks the first sheets 21 and the second sheets 22 in the housing unit 56 in order of the catch. The structure of the stacking unit 44 will be explained more in detail with reference to FIG. 5.

The detecting unit 46 detects the conditions of the first sheets 21 and the second sheets 22 which are being conveyed by the first precedent-stage conveyor unit 36, the second precedent-stage conveyor unit 38, and the subsequent-stage conveyor unit 42. The detecting unit 46 detects, for example, a scratch, a breakage, a bend, or a smear on the first sheet 21 or the second sheet 22.

The detecting unit 46 may also detect types of each of the first sheets 21 and each of the second sheets 22. Furthermore, for example, the detecting unit 46 may also detect, as to each of the first sheets 21 and each of the second sheets 22, a skew with respect to the conveying direction, an amount of offset in the width direction, a timing of passage, and a conveyance interval.

The rejection control unit 48 detects a defective first sheet 21 and a defective second sheet 22, based on the information detected by the detecting unit 46. For example, the rejection control unit 48 detects the first sheet 21 and the second sheet 22 each having a scratch, a breakage, a bend, a smear, or the like, as being defective ones. The rejection control unit 48 also detects, as defective ones, the first sheet 21 and the second sheet 22 exhibiting a skew with respect to the conveying direction by an amount equal to or more than a predetermined amount, an offset by an amount equal to or more than a predetermined amount in the width direction, a temporal error in the passage timing by a length of time equal to or more than a predetermined time with respect to a reference timing, or a temporal error in the conveyance interval by a length of time equal to or more than a predetermined time length with respect to a reference interval.

The rejecting unit 50 removes the defective first sheet 21 and the defective second sheet 22 detected by the rejection control unit 48 from the conveyance path, on the downstream side of the detecting unit 46 in the conveyance path. In this manner, the stacking unit 44 can stack the normal first sheets 21 and second sheets 22 at a predetermined position.

The rejecting unit 50 can also remove another first sheet 21 and another second sheet 22 being conveyed in a predetermined positional relation with the defective first sheet 21 and the defective second sheet 22, respectively, from the conveyance path. In this manner, the stacking unit 44 can stack a plurality of types of sheets 20 in predetermined order at a predetermined position.

The first supplying unit 32 and the second supplying unit 34 are each adjusted to output the first sheets 21 and the second sheets 22, respectively, at timings that allow the first sheets 21 and the second sheets 22 to arrive at the merge point in predetermined order. Therefore, the subsequent-stage conveyor unit 42 is able to convey the first sheets 21 and the second sheets 22 to the stacking unit 44 while lining up in the conveying direction. The stacking unit 44 catches the first sheets 21 and the second sheets 22 conveyed by the subsequent-stage conveyor unit 42 in order of the conveyance, and stacks the first sheets 21 and the second sheets 22 in order of the catch. As a result, the stacking unit 44 is able to stack the first sheets 21 and the second sheets 22 in predetermined order.

The first supplying unit 32 and the second supplying unit 34 are each adjusted to output each of the first sheets 21 and each of the second sheets 22, respectively, at timings that allow each of the first sheets and each of the second sheets to alternately arrive at the merge point. This configuration enables the subsequent-stage conveyor unit 42 to convey the first sheets 21 and the second sheets 22 alternately one by one to the stacking unit 44. Then, the stacking unit 44 is able to alternately stack the first sheets 21 and the second sheets 22 one by one.

The stacking apparatus 10 according to the embodiment having such a structure is capable of stacking the first sheets 21 and the second sheets 22 in predetermined order, without stopping the conveyance of the first sheets 21 and the second sheets 22. Therefore, with the stacking apparatus 10 according to the embodiment, it is possible to stack the first sheets 21 and the second sheets 22 at a high speed.

Figure 2:
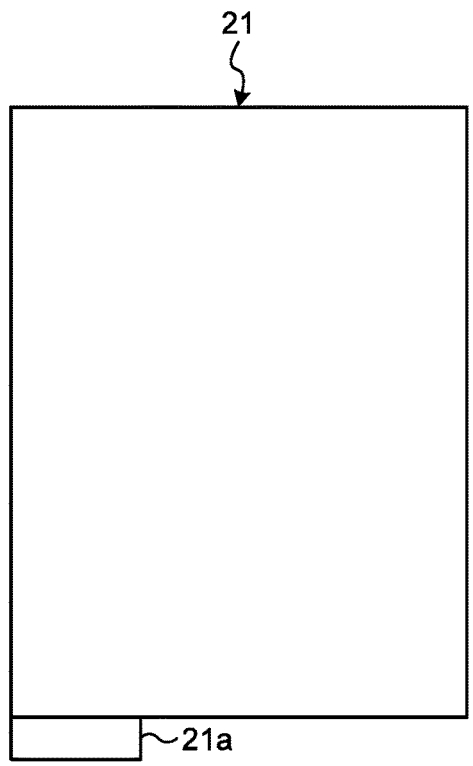
FIG. 2 is a schematic of a first sheet seen from the front side.
Figure 3:
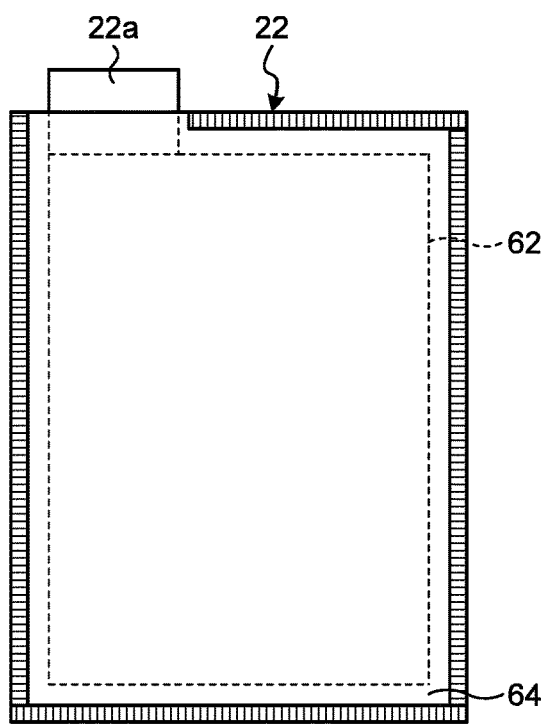
FIG. 3 is a schematic of a second sheet seen from the front side.
Figure 4:
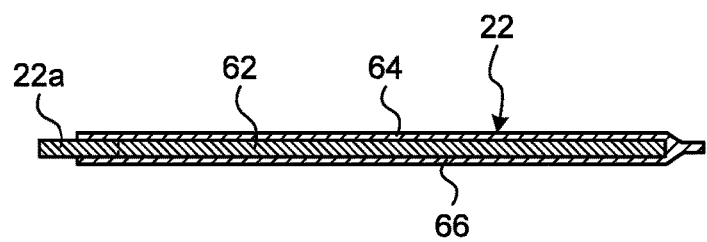
FIG. 4 is a cross-sectional view of the second sheet.

FIG. 2 is a schematic illustrating one example of the first sheet 21. FIG. 3 is a schematic illustrating one example of the second sheet 22. FIG. 4 is a schematic illustrating a cross section of one example of the second sheet 22.

In the present embodiment, it is assumed that the first sheet 21 is a member for making up one of the positive electrode and the negative electrode (for example, the negative electrode) that are housed inside of a battery. In the present embodiment, the second sheet 22 is a member for making up the other one of the positive electrode and the negative electrode, which is the electrode different from that of the first sheet 21 (for example, the positive electrode), housed inside of a battery.

As illustrated in FIG. 2, the principal surface of the first sheet 21 has a substantially rectangular shape. A tab 21*a* is provided on one side of the principal surface of the first sheet 21. The tab 21*a* is a plate piece that is sufficiently smaller than the entire principal surface of the first sheet 21. For example, the first supplying unit 32 forms a first sheet 21 by pulling out a long electrode material wound in a roll-like shape, and cutting the material using a cutter.

As illustrated in FIGS. 3 and 4, the principal surface of the second sheet 22 has a substantially rectangular shape. The second sheet 22 is a bagged electrode in which an electrode sheet 62 is sandwiched between two separators (a first separator sheet 64 and a second separator sheet 66) that insulate the electrode. The principal surface of the electrode sheet 62 has a substantially rectangular shape, with one side thereof provided with a tab 22*a*. The tab 22*a* is a plate piece that is sufficiently smaller than the entire principal surface of the second sheet 22. The tab 22*a* projects out from the two separators (the first separator sheet 64 and the second separator sheet 66). These two separators (the first separator sheet 64 and the second separator sheet 66) have a rectangular shape slightly larger than the electrode sheet 62, and envelope the electrode sheet 62, with the outer edges thereof bonded to each other except for the part corresponding to the tab 22*a*.

For example, the second supplying unit 34 forms an electrode sheet 62 having a substantially rectangular shape by pulling out a long electrode material wound in a roll-like shape, and cutting the material using a cutter. The second supplying unit 34 then pulls out two long separator materials in a coil-like shape, and causes the electrode sheet 62 to be sandwiched between the two separator materials having been pulled out. The second supplying unit 34 bonds the parts of the two separator materials that envelope the electrode sheet 62, around the electrode sheet 62, except for the parts corresponding to the tab 22*a*. The second supplying unit 34 then forms the second sheet 22 by cutting the two bonded separator materials enveloping the electrode sheet 62.

Figure 5:
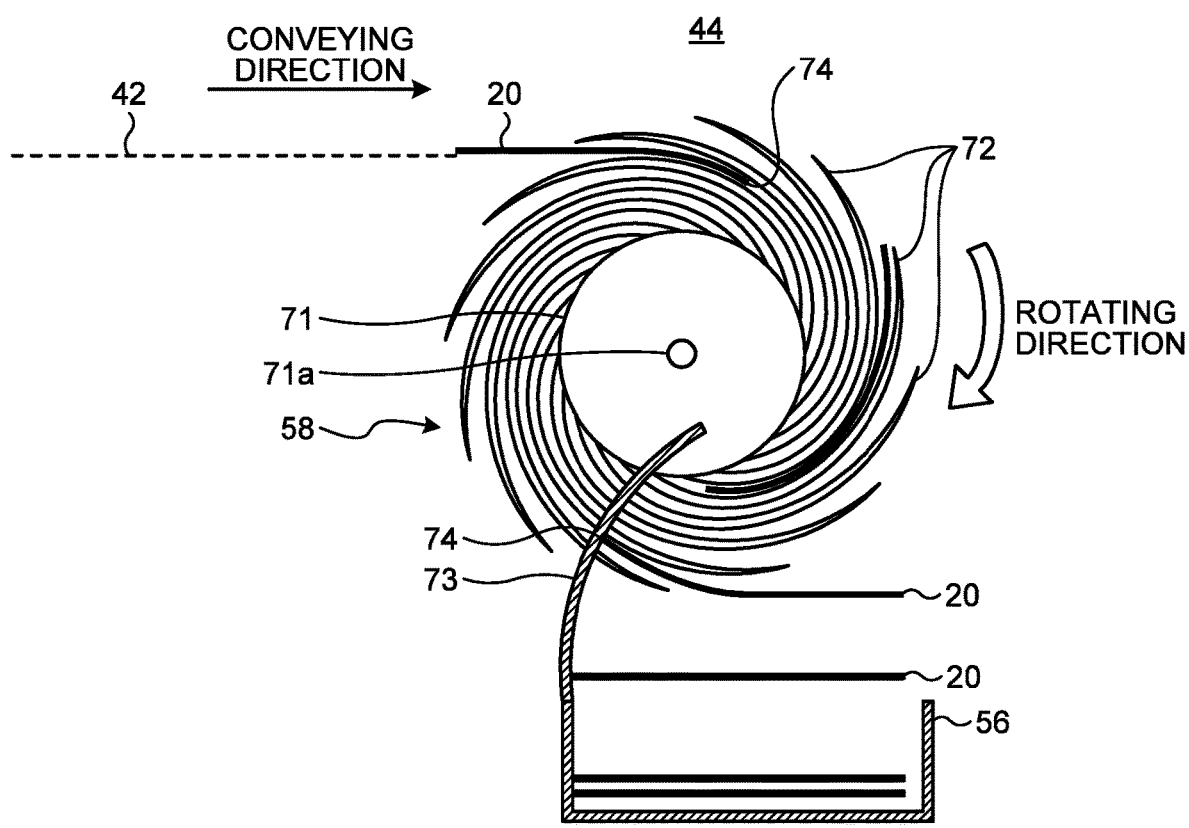
FIG. 5 is a schematic illustrating one example of a structure of a stacking unit.

FIG. 5 is a schematic illustrating one example of a structure of the stacking unit 44. The stacking unit 44 includes the housing unit 56 and the impeller 58.

The housing unit 56 has an internal space whose bottom surface is larger than the principal surface of the sheet 20 (the first sheet 21 or the second sheet 22). The housing unit 56 is positioned below the impeller 58. More specifically, the housing unit 56 is provided at a position that the sheet 20 released from the impeller 58 can drop to the internal space of the housing unit 56. The housing unit 56 houses the sheets 20 released from the impeller 58 in a manner that the released sheets 20 are stacked on top of one another in the internal space.

The impeller 58 includes a rotating unit 71, a plurality of vanes 72, and a restricting unit 73.

The rotating unit 71 has a cylindrical shape. The rotating unit 71 has a central shaft 71*a* that is positioned in a direction perpendicular to the direction in which the sheets 20 (the first sheet 21 and the second sheet 22) are conveyed by the subsequent-stage conveyor unit 42. The rotating unit 71 rotates about the central shaft 71*a*.

Each of the vanes 72 has a thin plate-like shape. Each of the vanes 72 has its base end attached to the side surface of the rotating unit 71. The vanes 72 are provided side by side at a predetermined interval, in the circumferential direction. Each of the vanes 72 has a thin pointed end at the tip, on the opposite side of the base end.

In the vanes 72, a gap into which the sheet 20 can be inserted is provided between two adjacent vanes 72. Each of the vanes 72 is bent in a manner delineating a curve about the central shaft 71*a*.

As the sheet 20 is moved in the conveying direction on the finish end of the subsequent-stage conveyor unit 42, the impeller 58 is brought to a position where the sheet 20 becomes inserted between any adjacent two of the vanes 72. In this manner, the sheet 20 having been conveyed by the subsequent-stage conveyor unit 42 become inserted into the gap formed between the two adjacent vanes 72 of the impeller 58, on the finish end of the subsequent-stage conveyor unit 42. In this manner, the impeller 58 can sequentially catch the sheets 20 being conveyed by the subsequent-stage conveyor unit 42 in a plurality of gaps formed between the vanes 72, by the rotation of the rotating unit 71.

When the rotating unit 71 is rotated, the two adjacent vanes 72 hold the sheet 20 inserted into the gap with a frictional force therebetween. In this manner, the impeller 58 can rotationally move the sheet 20 inserted into the gap formed between the two adjacent vanes 72.

When the rotating unit 71 is rotated, the restricting unit 73 restricts the movement of the sheet 20 held between the two adjacent vanes 72 to go forward in the rotating direction beyond the release position above the housing unit 56. By restricting the movement of the sheet 20 in such a manner that the sheet 20 does not move beyond the release position, the sheet 20 held between the two adjacent vanes 72 is released to the outside from the gap formed between the two adjacent vanes 72. In other words, when the rotating unit 71 is rotated, the restricting unit 73 causes the sheet 20 to be released from the two adjacent vanes 72 by restricting the movement of the sheet 20 held between the two adjacent vanes 72 to go forward in the rotating direction beyond the release position.

The restricting unit 73 also guides the sheet 20 released from the gap between the two adjacent vanes 72 to the outside in such a manner that the sheet 20 drops to the internal space of the housing unit 56. In this manner, the housing unit 56 can house the sheets 20 released from the restricting unit 73 in the internal space thereof, in a manner stacked on top of one another.

Such a stacking unit 44 sequentially catches the sheet 20 having been conveyed by the subsequent-stage conveyor unit 42 (the first sheet 21 and the second sheet 22), and stack the caught sheet 20 (the first sheet 21 and the second sheet 22) inside the housing unit 56 in order of the catch.

Figure 6:
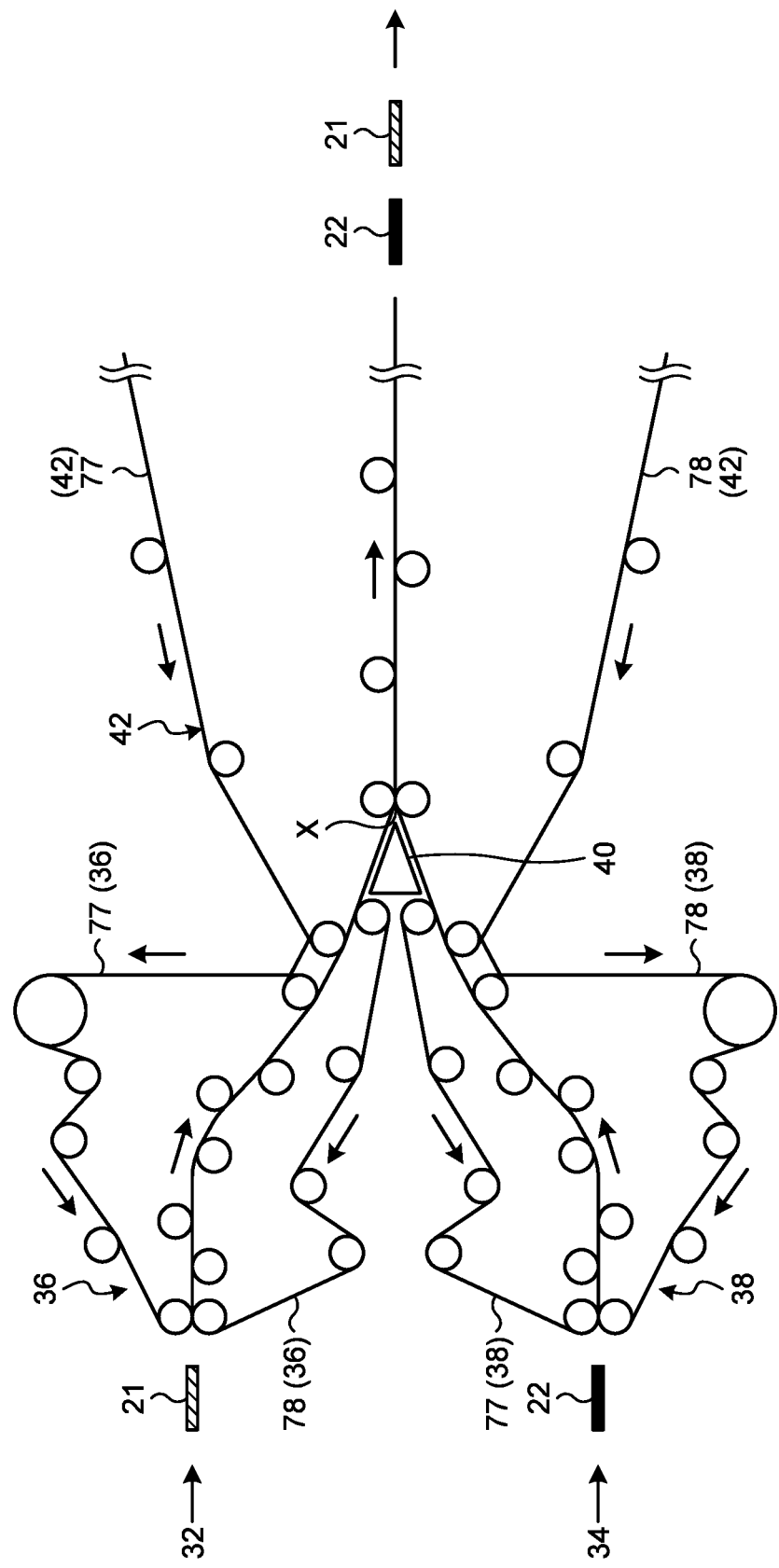
FIG. 6 is a schematic illustrating one example of a structure of a first precedent-stage conveyor unit, a second precedent-stage conveyor unit, and a subsequent-stage conveyor unit.

FIG. 6 is a schematic illustrating one example of a structure of the first precedent-stage conveyor unit 36, the second precedent-stage conveyor unit 38, and the subsequent-stage conveyor unit 42.

In the present embodiment, the first precedent-stage conveyor unit 36, the second precedent-stage conveyor unit 38, and the subsequent-stage conveyor unit 42 are each a sandwich-type belt conveyor device. The sandwich-type belt conveyor device includes an upper belt unit 77 and a lower belt unit 78. The sandwich-type belt conveyor device conveys the sheet 20 by holding the sheet 20 (the first sheet 21 and the second sheet 22) between the upper belt unit 77 and the lower belt unit 78.

The upper belt unit 77 and the lower belt unit 78 each include one or more ring-shaped belts. The belt included in the upper belt unit 77 and the belt included in the lower belt unit 78 are driven in rotation at substantially the same speed, in reversed directions, in a ring shape, with respect to each other.

The upper belt unit 77 and the lower belt unit 78 are disposed such that parts of them face each other while being nearly in contact with each other. The part of the upper belt unit 77 and the part of the lower belt unit 78 facing each other move in the same direction at substantially the same speed, and form a conveyance path for conveying the sheet 20.

The upper belt unit 77 and the lower belt unit 78 hold the sheet 20 such that the sheet 20 is sandwiched between the parts facing each other. The upper belt unit 77 and the lower belt unit 78 is able to move the sheet 20 held between them by causing the belts included therein to rotate in the reverse directions with respect to each other at the same speed, and thereby causing the part of the upper belt unit 77 and the part of the lower belt unit 78 facing each other to move at substantially the same speed in the same direction. In this manner, the upper belt unit 77 and the lower belt unit 78 can convey the sheet 20 along the conveyance path.

Furthermore, the frontmost position of the upper belt unit 77 and the lower belt unit 78 in the conveying direction, that is, the position where the upper belt unit 77 and the lower belt unit 78 start being brought into contact with each other serves as a start end. The rearmost position of the upper belt unit 77 and the lower belt unit 78 in the moving direction, that is, the position where the contact between the upper belt unit 77 and the lower belt unit 78 ends serves as a finish end.

The sheet 20 is fed from a leading edge thereof into the start end. In this manner, the upper belt unit 77 and the lower belt unit 78 catch the sheet 20 fed from the start end, and start conveying the caught sheet 20 by holding the sheet 20 between the upper belt unit 77 and the lower belt unit 78.

Furthermore, the sheet 20 is output, from the leading edge thereof, from the finish end. In this manner, the upper belt unit 77 and the lower belt unit 78 ends holding and conveying the sheet 20, and feed the sheet 20 to an external device.

The upper belt unit 77 and the lower belt unit 78 may include a plurality of belts that are arranged in line along the conveyance path.

The merging unit 40 guides the first sheet 21 at the finish end of the first precedent-stage conveyor unit 36 to the merge point. The merging unit 40 also guides the second sheet 22 at the finish end of the second precedent-stage conveyor unit 38 to the merge point.

In the present embodiment, the merge point is at the start end of the subsequent-stage conveyor unit 42. In other words, the merge point is at the point where the upper belt unit 77 and the lower belt unit 78 of the subsequent-stage conveyor unit 42 start being brought into contact with each other (for example, the position of X in FIG. 6).

In the present embodiment, the first sheet 21 is moved from the finish end of the first precedent-stage conveyor unit 36 to the start end of the subsequent-stage conveyor unit 42 by being held between the merging unit 40 and the upstream portion of the upper belt unit 77 of the subsequent-stage conveyor unit 42, which is upstream with respect to the start end (the position of X). Furthermore, in the present embodiment, the second sheet 22 is moved from the finish end of the second precedent-stage conveyor unit 38 to the start end of the subsequent-stage conveyor unit 42 by being held between the merging unit 40 and the upstream portion of the lower belt unit 78 of the subsequent-stage conveyor unit 42, which is upstream with respect to the start end (the position of X).

In the manner described above, the stacking apparatus 10 according to the embodiment moves the first sheets 21 and the second sheets 22 from the first precedent-stage conveyor unit 36 and the second precedent-stage conveyor unit 38, respectively, to the subsequent-stage conveyor unit 42, by causing the merging unit 40 to guide the first sheets 21 output from the first precedent-stage conveyor unit 36 to the merge point, and to guide the second sheets 22 output from the second precedent-stage conveyor unit 38 to the merge point. In this manner, the stacking apparatus 10 is able to stack the first sheets 21 and the second sheets 22 in predetermined order at a predetermined position without stopping the conveyance of the first sheets 21 and the second sheets 22.

Therefore, the stacking apparatus 10 according to the embodiment can stack the first sheets 21 and the second sheets 22 at a high speed. When the first sheets 21 and the second sheets 22 make up, for example, electrodes of a battery, the stacking apparatus 10 according to the embodiment can manufacture batteries efficiently at a high speed.

Figure 7:
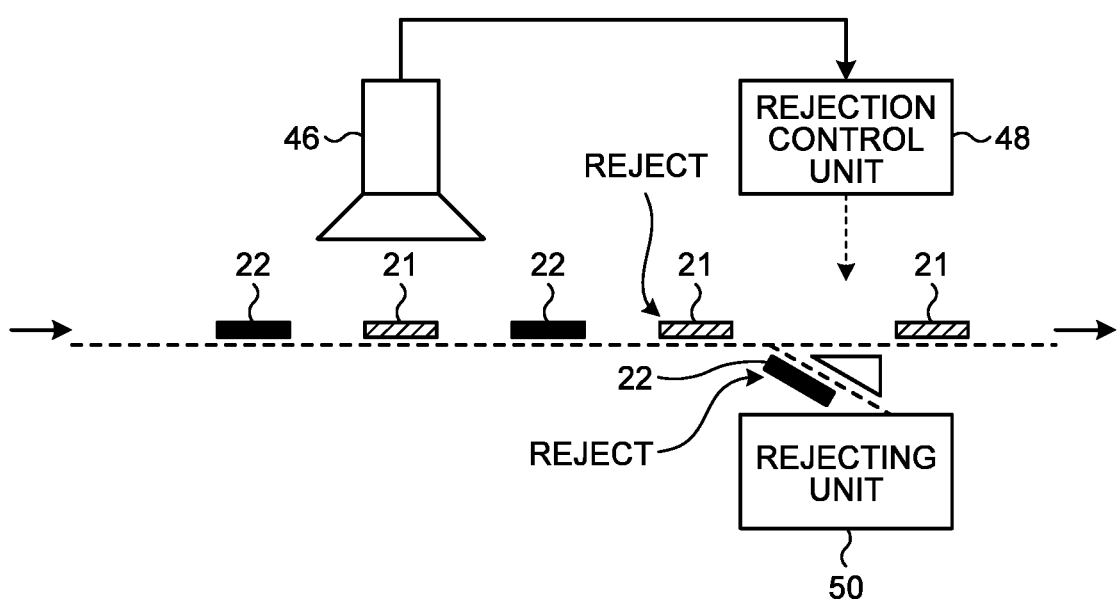
FIG. 7 is a schematic illustrating a partial structure of the stacking apparatus including a rejecting unit.

FIG. 7 is a schematic illustrating a partial structure of the stacking apparatus 10 including the rejecting unit 50. The detecting unit 46 detects the conditions of the first sheets 21 and the second sheets 22 being conveyed by the first precedent-stage conveyor unit 36, the second precedent-stage conveyor unit 38, and the subsequent-stage conveyor unit 42.

Examples of the detecting unit 46 include an image capturing device, an optical sensor, and another type of sensors. The detecting unit 46 may also include a plurality of types of sensors. Furthermore, the detecting unit 46 may be implemented as a plurality of sensors provided at a plurality of locations along the conveyance path.

The detecting unit 46 detects conditions of surfaces of the first sheets 21 and the second sheets 22 at a predetermined detection point in the subsequent-stage conveyor unit 42. The detecting unit 46 detects, as the surface condition, a scratch, a breakage, a bend, a smear, or the like on the first sheets 21 and the second sheets 22.

The detecting unit 46 may also detect types of the first sheet 21 and the second sheet 22. In other words, the detecting unit 46 may detect which of the first sheet 21 and the second sheet 22 is currently passing by.

Furthermore, the detecting unit 46 may also detect a condition of the conveyance of the first sheet 21 and the second sheet 22 at the detection point. For example, the detecting unit 46 detects, as the conveyance conditions, skews of the first sheet 21 and the second sheet 22 with respect to the conveying direction, an amount of offset by which the first sheet 21 and the second sheet 22 are shifted in the direction perpendicular to the conveying direction (width direction), timing of passage at which the first sheet 21 and the second sheet 22 pass the detection point, and the conveyance interval between the first sheet 21 and the second sheet 22 that are being conveyed adjacently to each other.

The rejection control unit 48 detects a defective first sheet 21 and a defective second sheet 22 based on the information detected by the detecting unit 46. For example, the rejection control unit 48 detects, as defective ones, the first sheet 21 and the second sheet 22 each having a scratch, a breakage, a bend, a smear, or the like. Furthermore, for example, the rejection control unit 48 detects, as defective ones, the first sheet 21 and the second sheet 22 exhibiting an skew with respect to the conveying direction by an amount equal to or more than a predetermined amount, an offset by an amount equal to or more than a predetermined amount in the width direction, an error in the passage timing by a length of time equal to or more than a predetermined time with respect to the reference timing, or an error in the conveyance interval with respect to the reference interval by a length of time equal to or more than a predetermined time length.

The rejecting unit 50 removes the defective first sheet 21 and the defective second sheet 22 detected by the rejection control unit 48, from the conveyance path on the downstream side of the detecting unit 46 in the conveyance path. The rejecting unit 50 may include, for example, a sorting gate for removing the first sheet 21 and the second sheet 22 passing therethrough on the conveyance path, and a rejection box. The rejecting unit 50 causes the defective first sheet 21 or the defective second sheet 22 to move into the rejection box from the conveyance path by activating the sorting gate at a timing at which the defective first sheet 21 or the defective second sheet 22 detected by the rejection control unit 48 arrive at the sorting gate.

Such a rejecting unit 50 is capable of preventing the defective first sheet 21 and the defective second sheet 22 from being fed into the stacking unit 44 via the subsequent-stage conveyor unit 42. Thus, the stacking apparatus 10 can stack the first sheets 21 and the second sheets 22, each being normal.

The rejecting unit 50 may remove, from the conveyance path, another first sheet 21 and another second sheet 22, each being conveyed in a predetermined positional relation with the defective first sheet 21 and second sheet 22, respectively. With this manner, the stacking unit 44 can stack the first sheets 21 and the second sheets 22 in predetermined order.

For example, when the first sheets 21 and the second sheets 22 are being conveyed in a manner alternately lined up one by one, the rejecting unit 50 removes a second sheet 22 being conveyed immediately before or after a defective first sheet 21, and a first sheet 21 being conveyed immediately before or after a defective second sheet 22. With this manner, the stacking unit 44 is able to alternately stack the first sheets 21 and the second sheets 22 one by one.

Furthermore, when a plurality of types of the sheets 20 are to be conveyed in line in a predetermined pattern, the rejecting unit 50 detects the pattern corresponding to one cycle in which a defective sheet 20 arises, and removes the entire sheets 20 included in the detected pattern from the conveyance path. With this manner, the stacking unit 44 is able to stack a plurality of types of the sheets 20 in predetermined order.

Figure 8:
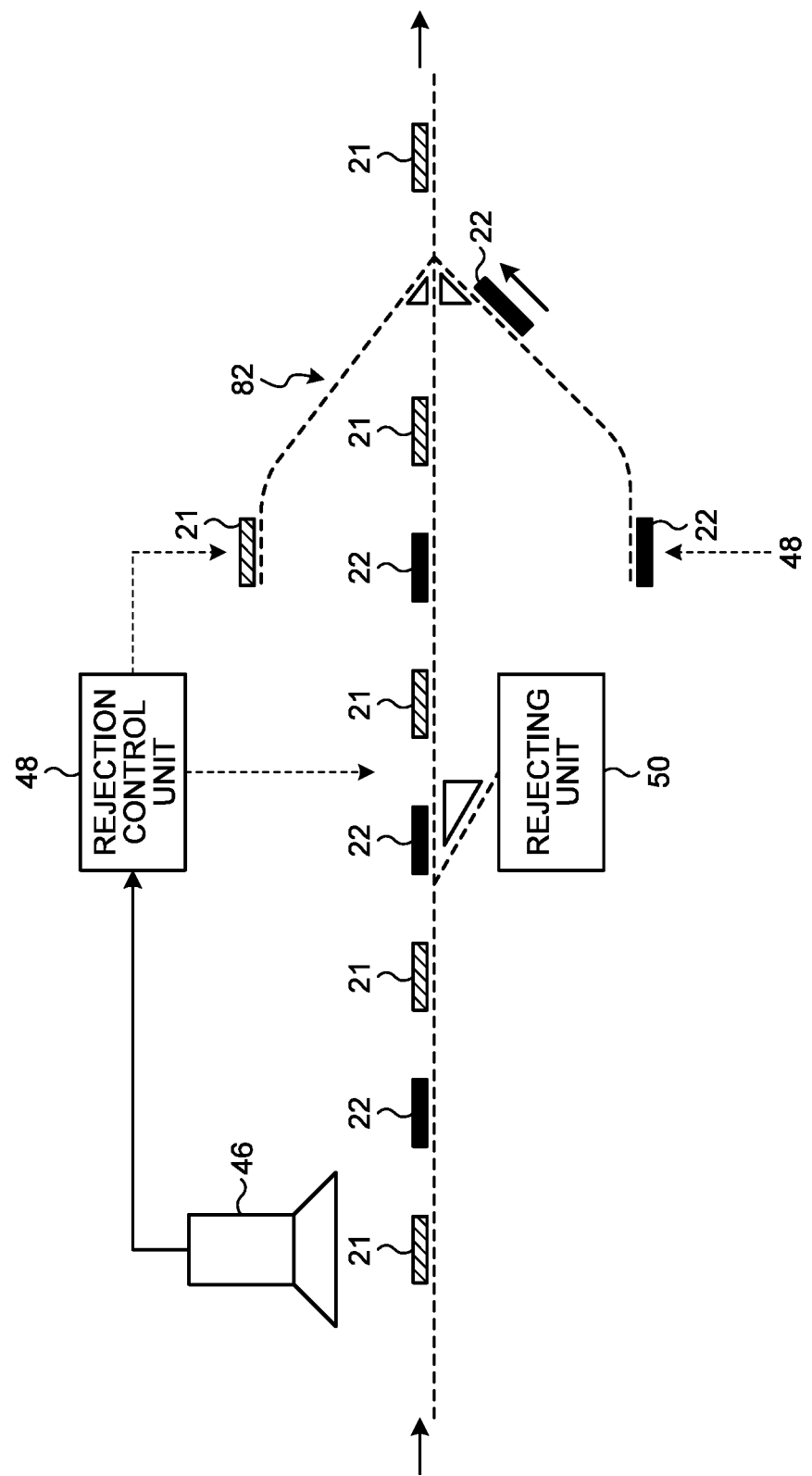
FIG. 8 is a schematic illustrating a partial structure of the stacking apparatus including a reloading unit.

FIG. 8 is a schematic illustrating a partial structure of the stacking apparatus 10 including a reloading unit 82. The stacking apparatus 10 may also include the reloading unit 82.

The reloading unit 82 feeds, at a reloading point positioned downstream of the rejecting unit 50 in the conveyance path, a sheet 20 out of the first sheets 21 and the second sheets 22, which belongs to the same type as that of a defective sheet 20 removed by the rejecting unit 50. The sheet 20 for reloading is fed at a timing at which the defective first sheet 21 or the defective second sheet 22 removed by the rejecting unit 50 is originally scheduled to pass the reloading point.

Specifically, in the case where a defective first sheet 21 is removed, the reloading unit 82 reloads a new first sheet 21 at the timing at which the removed first sheet 21 is originally scheduled to pass the reloading point. In the case where a defective second sheet 22 is removed, the reloading unit 82 reloads a new second sheet 22 at the timing at which the removed second sheet 22 is originally scheduled to pass the reloading point. The reloading unit 82 determines which of the first sheet 21 and the second sheet 22 is to be fed, and determines the timing when the sheet is to be reloaded, in accordance with the control of the rejection control unit 48.

With this manner, the stacking apparatus 10 is able to stack the first sheets 21 and the second sheets 22 in predetermined order even when the defective first sheet 21 or second sheet 22 is removed from the conveyance path. In addition, in the configuration including the reloading unit 82, the stacking apparatus 10 is able to stack the first sheets 21 and the second sheets 22 in predetermined order without removing the normal first sheet 21 or second sheet 22, so that the production efficiency can be improved.

Figure 9:
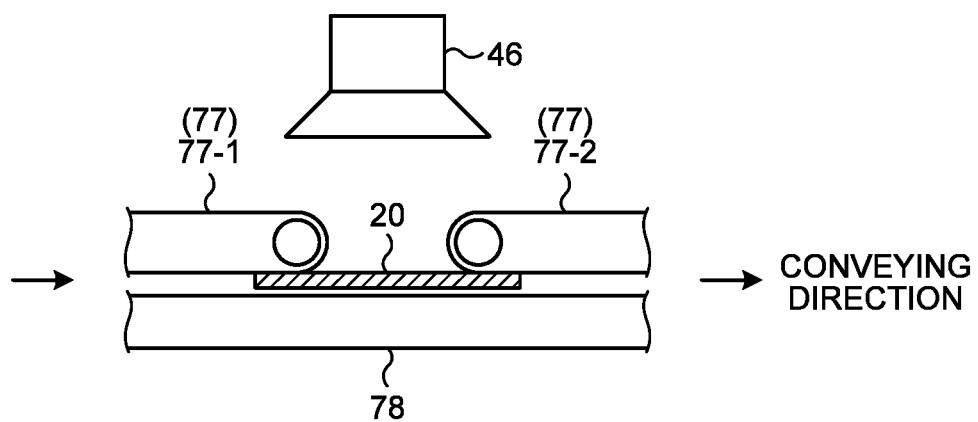
FIG. 9 is a schematic illustrating a structure of a detecting unit and part of a sandwich-type belt conveyor device.

FIG. 9 is a schematic illustrating a structure of the detecting unit 46 and part of the sandwich-type belt conveyor device.

When the first precedent-stage conveyor unit 36, the second precedent-stage conveyor unit 38, and the subsequent-stage conveyor unit 42 are each a sandwich-type belt conveyor device, the detecting unit 46 detects a surface condition of a sheet 20 (a first sheet 21 or a second sheet 22) at the position illustrated in FIG. 9, for example.

The upper belt unit 77 includes a plurality of belts that are arranged along the conveyance path. For example, in the example illustrated in FIG. 9, the upper belt unit 77 includes a first upper belt 77-1 and a second upper belt 77-2. The second upper belt 77-2 is provided downstream of the first upper belt 77-1.

Between the first upper belt 77-1 on the upstream side and the second upper belt 77-2 on the downstream side, a space spanning across a predetermined distance is provided. This space is shorter than the length of the sheet 20 in the conveying direction. In this manner, the upper belt unit 77 is able to expose a surface of the sheet 20 facing the upper belt unit 77 while holding the sheet 20.

In such a case, the detecting unit 46 is able to detect the surface of the sheet 20 exposed through the space between the first upper belt 77-1 and the second upper belt 77-2. The detecting unit 46 captures an image of the surface of the sheet 20 exposed through the space. With this manner, the detecting unit 46 is able to detect the condition of the entire surface of the sheet 20 in a direction perpendicular to the conveying direction (width direction). Furthermore, the detecting unit 46 is able to detect the entire surface of the sheet 20 in the conveying direction by continuously detecting the surface of the sheet 20 while the sheet 20 is moved across the space between the first upper belt 77-1 and the second upper belt 77-2.

The lower belt unit 78 may have the same structure as the upper belt unit 77, illustrated in FIG. 9. In such a case, the detecting unit 46 also detects the surface condition of the sheet 20, which is exposed through the space formed in the lower belt unit 78. With this manner, the detecting unit 46 is able to detect conditions of the two surfaces of the sheet 20.

Figure 10:
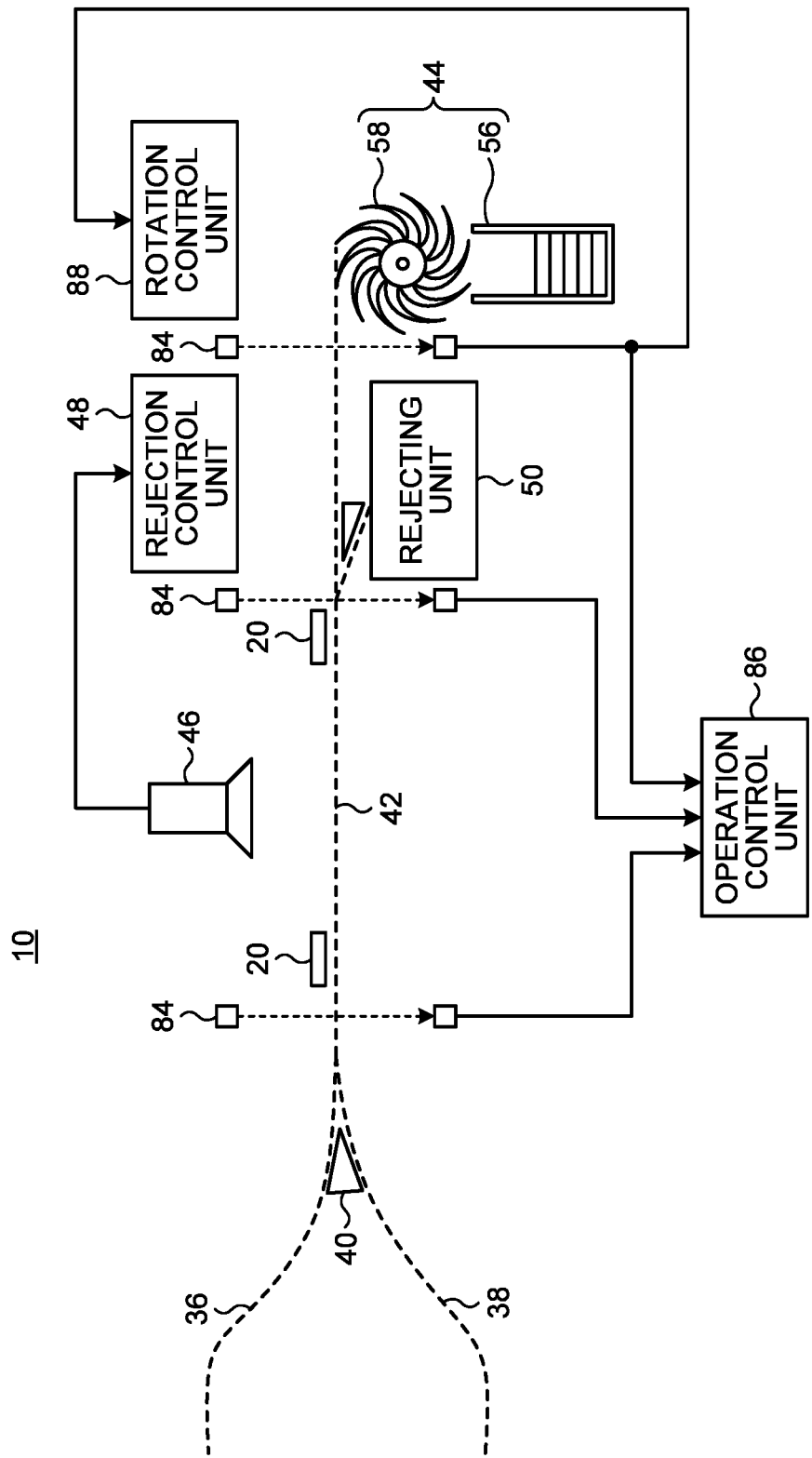
FIG. 10 is a schematic illustrating a first example of a structure of the stacking apparatus including a passage timing detecting unit.

FIG. 10 is a schematic illustrating a first example of a structure of the stacking apparatus 10 including a passage timing detecting unit 84.

The stacking apparatus 10 may further include one or more passage timing detecting units 84. Each of the passage timing detecting units 84 detects the timing of passage of each sheet 20 (the first sheets 21 and the second sheets 22) at a predetermined detection point in the conveyance path. For example, the stacking apparatus 10 detects the timing of passage of the sheet 20 at a predetermined detection point in the subsequent-stage conveyor unit 42.

Each of the passage timing detecting units 84 is an optical sensor, for example. The passage timing detecting unit 84 being the optical sensor includes: a light emitter unit that emits light; and a light receiver unit that receives the light emitted from the light emitter unit. The light emitter unit and the light receiver unit are provided at both sides over the conveyance path, which correspond to a predetermined detection point in the conveying direction. When the light emitted from the light emitter unit is blocked and does not reach the light receiver unit, the passage timing detecting unit 84 can detect that the sheet 20 is passing the detection point.

Each of the one or more passage timing detecting units 84 may detect a passage speed of the sheet 20 moving across the detection point. For example, the passage timing detecting unit 84 measures a time difference between: the timing at which the leading edge of the sheet 20 in the conveying direction has passed the detection point; and the timing at which the trailing edge of the sheet 20 in the conveying direction has passed the detection point. The passage timing detecting unit 84 then detects the passage speed by dividing the preset length of the sheet 20 in the conveying direction by the measured time difference.

The stacking apparatus 10 may further include an operation control unit 86. The operation control unit 86 acquires the passage timing of the sheet 20, which is detected by the one or more passage timing detecting units 84. The operation control unit 86 then determines whether the sheet 20 has passed the detection point at an appropriate timing. For example, if a subsequent sheet 20 has not passed the detection point although time equal to or more than a predetermined time has passed since the last sheet 20 has passed the detection point, the operation control unit 86 may determine that some trouble has occurred in the conveying operation. Furthermore, for example, if the passage speed of the sheet 20 at the detection point does not fall within a predetermined range, the operation control unit 86 may determine that some trouble has occurred in the conveying operation. If it is determined that some trouble has occurred, the operation control unit 86 then performs an operation such as stopping the conveying operation, or giving a warning to a manager device, an administrator, or the like.

The stacking apparatus 10 may further include a rotation control unit 88. The rotation control unit 88 controls the rotation of the impeller 58 in the stacking unit 44. The rotation control unit 88 acquires the passage timing of the sheet 20 at the one or more detection points detected by the one or more passage timing detecting units 84, and controls the rotational phase of the impeller 58, based on the acquired timing of passage. More specifically, the rotation control unit 88 controls the rotational phase of the impeller 58 in such a manner that the sheet 20 conveyed into the impeller 58 is precisely inserted into a gap between the two adjacent vanes 72 of the impeller 58. With this manner, the stacking unit 44 can sequentially catch the sheet 20 from the subsequent-stage conveyor unit 42, reliably.

Figure 11:
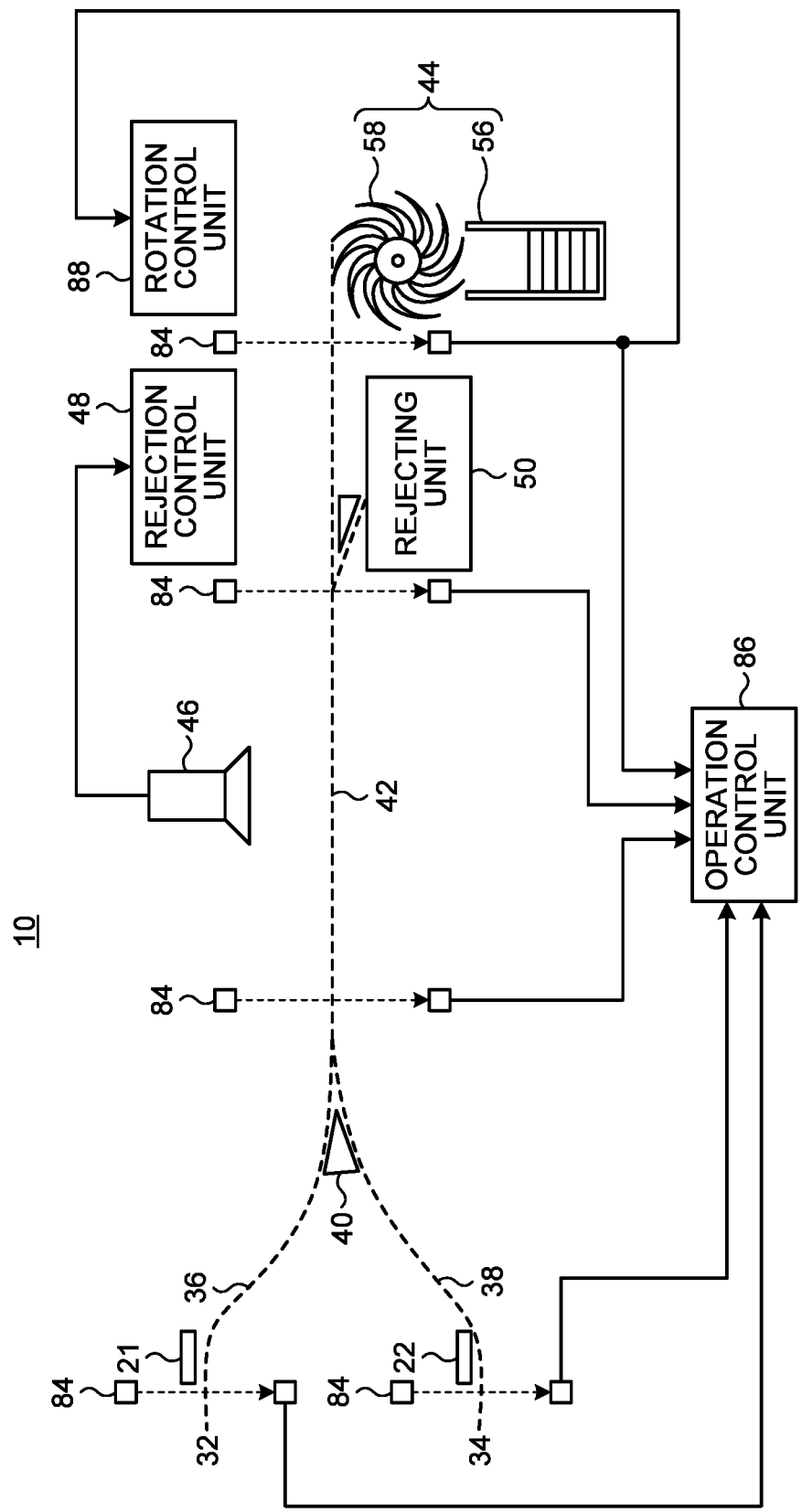
FIG. 11 is a schematic illustrating a second example of the structure of the stacking apparatus including the passage timing detecting unit.

FIG. 11 is a schematic illustrating a second example of a structure of the stacking apparatus 10 including the passage timing detecting unit 84.

The passage timing detecting unit 84 may be provided at a predetermined detection point in the first precedent-stage conveyor unit 36. In such a case, the operation control unit 86 can determine whether the first supplying unit 32 is feeding the first sheet 21 normally and whether the first precedent-stage conveyor unit 36 is conveying the first sheet 21 normally.

The passage timing detecting unit 84 may be provided at a predetermined detection point in the second precedent-stage conveyor unit 38. In such a case, the operation control unit 86 can determine whether the second supplying unit 34 is feeding the second sheet 22 normally and whether the second precedent-stage conveyor unit 38 is conveying the second sheet 22 normally.

Figure 12:
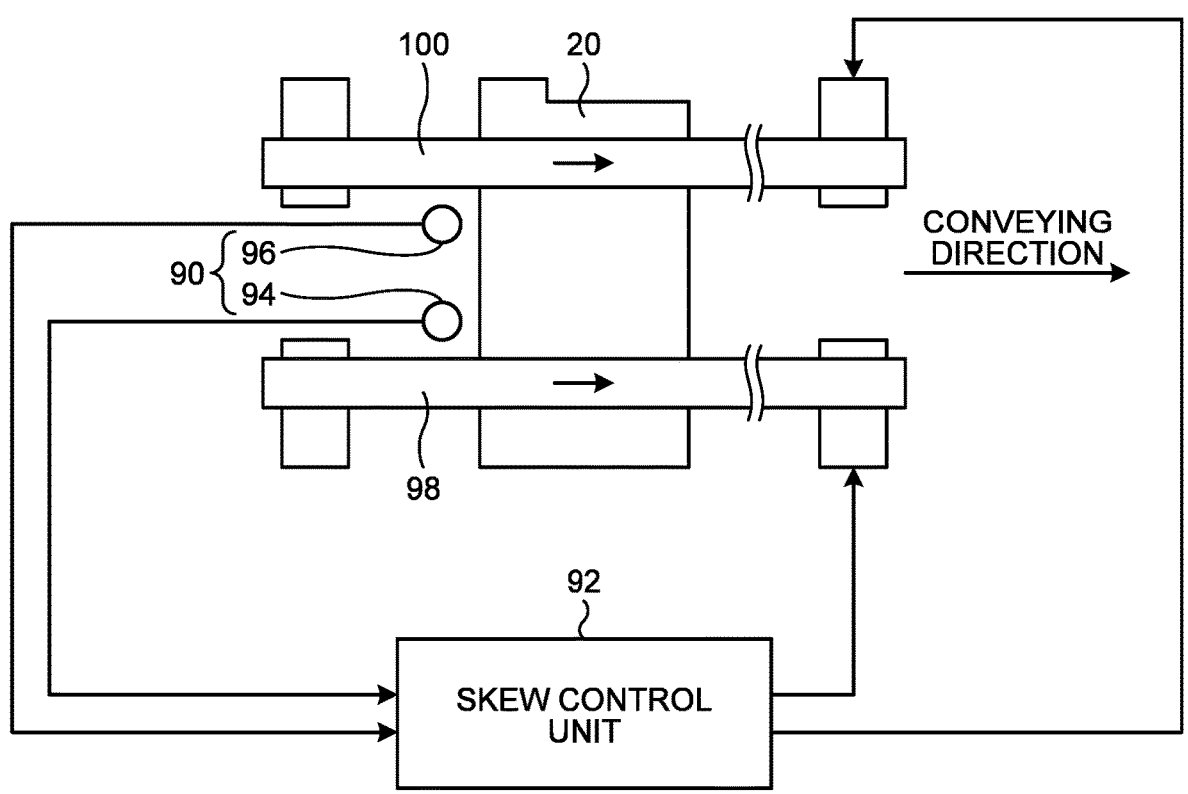
FIG. 12 is a schematic illustrating a structure of a skew detecting unit and part of a belt conveyor device.

FIG. 12 is a schematic illustrating a structure of a skew detecting unit 90 and part of the sandwich-type belt conveyor device. The stacking apparatus 10 may also include a skew detecting unit 90 and a skew control unit 92.

The skew detecting unit 90 detects a skew of the sheet 20 (the first sheet 21 and the second sheet 22) with respect to the conveying direction at a predetermined detection point in the conveyance path. The skew control unit 92 controls the operations of the first precedent-stage conveyor unit 36, the second precedent-stage conveyor unit 38, or the subsequent-stage conveyor unit 42, based on the skew detected by the skew detecting unit 90 to adjust the skew of the passing sheet 20 (the first sheet 21 and the second sheet 22).

The skew control unit 92 includes a right sensor 94 and a left sensor 96, which are arranged side by side in the direction perpendicular to the conveying direction (width direction). Each of the right sensor 94 and the left sensor 96 detects whether the sheet 20 has passed the detection point. Each of the right sensor 94 and the left sensor 96 is an optical sensor, for example. Each of the right sensor 94 and the left sensor 96 being the optical sensor includes: a light emitter unit that emits light; and a light receiver unit that receives the light emitted from the emitter unit. The light emitter unit and the light receiver unit are provided at both sides over the conveyance path. When the light emitted from the light emitter unit is blocked and does not reach the light receiver unit, each of such a right sensor 94 and left sensor 96 can detect that the sheet 20 is passing the detection point.

When the passing sheet 20 is not skewed, the right sensor 94 and the left sensor 96 detect the leading edge or the trailing edge of the sheet 20 in the conveying direction at the same timing. When the passing sheet 20 is skewed, the right sensor 94 and the left sensor 96 detect the leading edge or the trailing edge of the sheet 20 in the conveying direction at different timings.

The skew control unit 92 detects a skew amount and a skew direction of the sheet 20 that is passing by, based on the difference between: the timing at which the right sensor 94 detects the leading or trailing edge; and the timing at which the left sensor 96 detects the leading or trailing edge. The skew control unit 92 then adjusts the skew of the passing sheet 20 to cause the skew of the passing sheet 20 to be zero.

For example, the first precedent-stage conveyor unit 36, the second precedent-stage conveyor unit 38, or the subsequent-stage conveyor unit 42 includes a right belt 98 and a left belt 100 that are disposed at the detection point. The right belt 98 and the left belt 100 are positioned facing each other with respect to a substantial center of the direction perpendicular to the conveying direction.

The right belt 98 is provided on the right side of the conveyance path. The left belt 100 is provided on the left side of the conveyance path. The right belt 98 and the left belt 100 are rotated to convey the passing sheet 20 in the conveying direction. The right belt 98 and the left belt 100 rotate independently of each other. Therefore, the right belt 98 and the left belt 100 can rotate at mutually different speeds.

In such a case, the skew control unit 92 adjusts the rotation speeds of the right belt 98 and the left belt 100 based on the skew detected by the skew detecting unit 90. With the manner described above, the skew control unit 92 is able to adjust the skew of the passing sheet 20.

Figure 13:
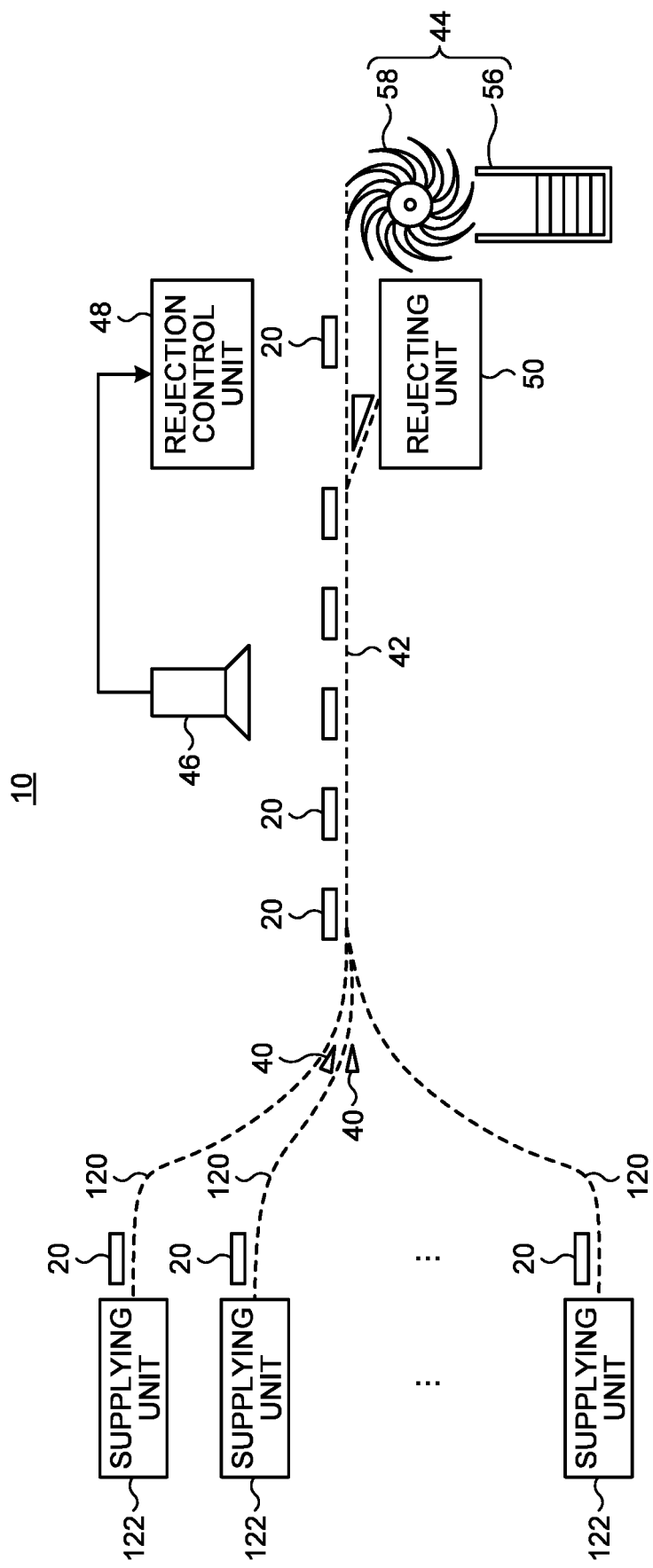
FIG. 13 is a schematic illustrating a structure of a stacking apparatus including N precedent-stage conveyor units.

FIG. 13 is a schematic illustrating a structure of the stacking apparatus 10 including N precedent-stage conveyor units 120.

The stacking apparatus 10 may include N precedent-stage conveyor units 120 (where N is an integer equal to or more than two) in place of the first precedent-stage conveyor unit 36 and the second precedent-stage conveyor unit 38. In such a case, the stacking apparatus 10 includes N supplying units 122 in place of the first supplying unit 32 and the second supplying unit 34.

Each of the N precedent-stage conveyor units 120 conveys the sheets 20. Each of the N precedent-stage conveyor units 120 conveys the sheets 20 belonging to each individual type determined in advance. For example, the N precedent-stage conveyor units 120 convey sheets 20 of different types from one another. In the present embodiment, each of the N precedent-stage conveyor units 120 is a sandwich-type belt conveyor device. Alternatively, each of the N precedent-stage conveyor units 120 may be a suction belt conveyor device.

The N supplying units 122 are provided to correspond to the respective N precedent-stage conveyor units 120. Each of the N supplying units 122 sequentially outputs a plurality of sheets 20 one by one to the corresponding precedent-stage conveyor unit 120. For example, each of the N supplying units 122 sequentially forms the sheets 20 one by one, and then feeds, at a predetermined timing, the formed sheets one by one to the corresponding precedent-stage conveyor unit 120 in order of the formation.

In the present embodiment, the merging unit 40 guides the sheets 20 output from each of the N precedent-stage conveyor units 120 to the merge point. In other words, the merging unit 40 guides the sheet 20 output from each of the N precedent-stage conveyor units 120 in such a manner that the sheets 20 moves to the merge point.

The timing at which each of the N supplying units 122 outputs the sheets 20 is adjusted such that the sheets 20 arrive at the merge point in a manner lined up in predetermined order. Thus, the subsequent-stage conveyor unit 42 can arrange a plurality of types of the sheets 20 in predetermined order in the conveying direction, and convey the sheets to the stacking unit 44. The stacking unit 44 then catches a plurality of types of the sheets 20 conveyed by the subsequent-stage conveyor unit 42 in order of the conveyance, and stacks the plurality of types of the sheets 20 at a predetermined position in order of the catch. With this manner, the stacking unit 44 is able to stack a plurality of types of the sheets 20 in predetermined order.

The stacking apparatus 10 according to the embodiment having such a structure is capable of stacking a plurality of types of sheets 20 in predetermined order without stopping the conveyance of a plurality of types of the sheets 20. With this manner, the stacking apparatus 10 according to the embodiment can stack a plurality of types of sheets 20 at a predetermined position at a high speed.

Figure 14:
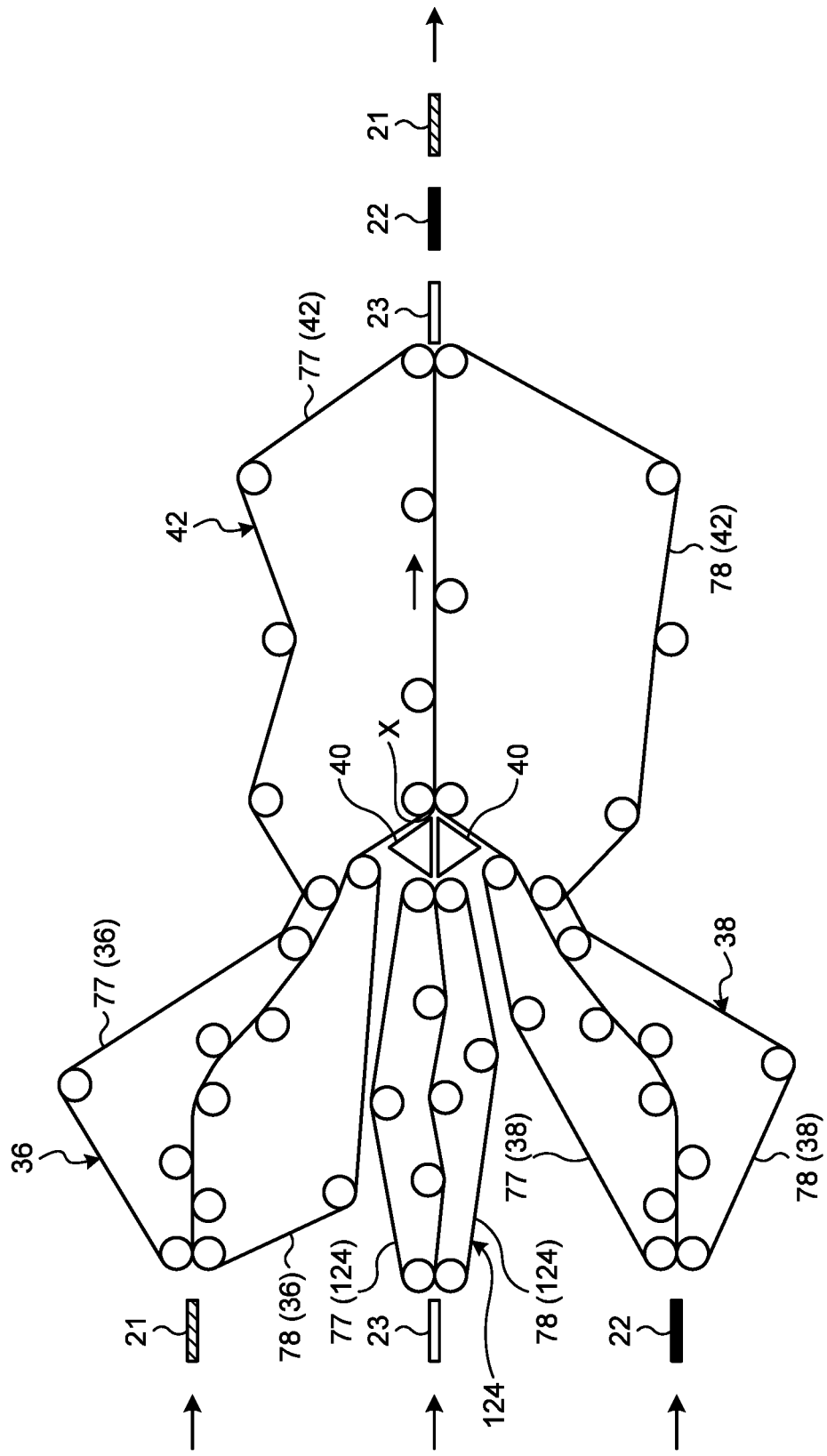
FIG. 14 is a schematic illustrating one example of a structure of first to third precedent-stage conveyor units and a subsequent-stage conveyor unit.

FIG. 14 is a schematic illustrating one example of a structure of the first precedent-stage conveyor unit 36, the second precedent-stage conveyor unit 38, a third precedent-stage conveyor unit 124, and the subsequent-stage conveyor unit 42.

In a case of N=3, the stacking apparatus 10 includes the first precedent-stage conveyor unit 36, the second precedent-stage conveyor unit 38, and the third precedent-stage conveyor unit 124, as the N precedent-stage conveyor units 120. The third precedent-stage conveyor unit 124 sequentially receives the third sheets 23 one by one and conveys the received third sheets 23 in order of the reception. The third precedent-stage conveyor unit 124 is a sandwich-type belt conveyor device including the upper belt unit 77 and the lower belt unit 78, in the same manner as the first precedent-stage conveyor unit 36, for example.

The merging unit 40 guides the first sheet 21 from the finish end of the first precedent-stage conveyor unit 36 to the merge point (the position of X in FIG. 14), and guides the second sheet 22 from the finish end of the second precedent-stage conveyor unit 38 to the merge point.

The merging unit 40 also guides the third sheets 23 from the finish end of the third precedent-stage conveyor unit 124 to the merge point. In the example illustrated in FIG. 14, the merging unit 40 includes an upper surface and a bottom surface by which the third sheet 23 is sandwiched. The merging unit 40 guides the third sheet 23 from the third precedent-stage conveyor unit 124 to the merge point (the position of X in FIG. 14) while keeping the third sheet 23 sandwiched therebetween. The distance between the finish end of the third precedent-stage conveyor unit 124 and the merge point is shorter than the length of the third sheet 23 in the conveying direction. Therefore, before the trailing edge of the third sheet 23 comes out of the finish end of the third precedent-stage conveyor unit 124, the leading edge arrives at the merge point (the subsequent-stage conveyor unit 42). Therefore, the merging unit 40 can move the third sheet 23 from the third precedent-stage conveyor unit 124 to the subsequent-stage conveyor unit 42 without stopping the conveyance of the third sheet 23.

In the manner described above, in the stacking apparatus 10 according to the embodiment, by the merging unit 40 that guides the first sheet 21, the second sheet 22, and the third sheet 23 to the merge point, the first sheet 21, the second sheet 22, and the third sheet 23 are fed from the first precedent-stage conveyor unit 36, the second precedent-stage conveyor unit 38, and the third precedent-stage conveyor unit 124, respectively, to the subsequent-stage conveyor unit 42. With this manner, the stacking apparatus 10 is able to stack the first sheet 21, the second sheet 22, and the third sheet 23 in predetermined order, at a predetermined position without stopping the conveyance of the first sheet 21, the second sheet 22, and the third sheet 23.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiment described herein may be made without departing from the spirit of the inventions. The accompanying claims and their equivalents are intended to cover such forms or modifications as would fall within the scope and spirit of the inventions.

What is claimed is:

1. A stacking apparatus comprising:
   a first precedent-stage conveyor mechanism that conveys one or more first sheets;
   a second precedent-stage conveyor mechanism that conveys one or more second sheets;
   a merging mechanism that guides, to a merge point, each of the first sheets output from the first precedent-stage conveyor mechanism and guides, to the merge point, each of the second sheets output from the second precedent-stage conveyor mechanism;
   a subsequent-stage conveyor mechanism that
      sequentially receives, at the merge point, each of the first sheets and each of the second sheets conveyed by the first precedent-stage conveyor mechanism and the second precedent-stage conveyor mechanism, respectively, and
      conveys each of the first sheets and each of the second sheets in order of the reception while lining up in a conveying direction;
   a stacking mechanism that
      sequentially catches each of the first sheets and each of the second sheets conveyed by the subsequent-stage conveyor mechanism, and
      stacks, at a predetermined position, each of the first sheets and each of the second sheets in order of the catch,
   a detecting mechanism that detects a condition of the first sheets and the second sheets which are being conveyed by the first precedent-stage conveyor mechanism, the second precedent-stage conveyor mechanism, and the subsequent-stage conveyor mechanism;
   a rejection control mechanism that detects a defective first sheet and a defective second sheet from among the first sheets and the second sheets based on the condition of the first sheets and the second sheets; and
   a rejecting mechanism that removes the defective first sheet and the defective second sheet at a downstream of the detecting mechanism in a conveyance path,
   wherein the rejecting mechanism removes, in addition to the defective first sheet and the defective second sheet, another first sheet and another second sheet that are conveyed in a predetermined positional relation with the defective first sheet and the defective second sheet.

2. The apparatus according to claim 1, further comprising:
   a first supplying mechanism that sequentially outputs the first sheets one by one to the first precedent-stage conveyor mechanism; and
   a second supplying mechanism that sequentially outputs the second sheets one by one to the second precedent-stage conveyor mechanism,
   wherein the first supplying mechanism and the second supplying mechanism are each adjusted to output each of the first sheets and each of the second sheets, respectively, at timings that allow the first sheets and the second sheets to arrive at the merge point in predetermined order.

3. The apparatus according to claim 1, wherein
   the stacking mechanism includes a housing mechanism and an impeller mechanism, and
   the impeller mechanism is configured to
      sequentially catch each of the first sheets or each of the second sheets between vanes at a finish end of the subsequent-stage conveyor mechanism,
      move the caught first sheet or the caught second sheet to a release position above the housing mechanism by rotating while holding the caught first sheet or the caught second sheet, and
      stack, in order of the catch, the first sheet and the second sheet in the housing mechanism by releasing, into the housing mechanism, the first sheet or the second sheet at the release position from between the vanes and dropping the first sheet or the second sheet.

4. The apparatus according to claim 3, further comprising:
   a passage timing detecting mechanism that detects a timing of passage of each of the first sheets and a timing of passage of each of the second sheets at a predetermined detection point in a conveyance path; and
   a rotation control mechanism that controls, based on the timings of passage, a rotational phase of the impeller mechanism.

5. The apparatus according to claim 1, wherein the first precedent-stage conveyor mechanism, the second precedent-stage conveyor mechanism, and the subsequent-stage conveyor mechanism
   each include an upper belt and a lower belt that are disposed to face each other along a conveyance path, and each convey the first sheets and the second sheets while holding the first sheets and the second sheets between the corresponding upper belt and the corresponding lower belt.

6. The apparatus according to claim 1, wherein each of the first precedent-stage conveyor mechanism, the second precedent-stage conveyor mechanism, and the subsequent-stage conveyor mechanism
   each include a belt disposed in such a manner that part of the belt extends along a conveyance path, and
   each convey the first sheets and the second sheets while sucking the first sheets and the second sheets on one surface of the corresponding belt.

7. The apparatus according to claim 1, further comprising a reloading mechanism that feeds, at a reloading point positioned downstream of the rejecting mechanism in the conveyance path, a sheet out of the first sheets and the second sheets, which belongs to a same type as that of the defective first sheet or the defective second sheet removed by the rejecting mechanism, the sheet being fed at a timing at which the defective first sheet or the defective second sheet removed by the rejecting mechanism is originally scheduled to pass the reloading point.

8. The apparatus according to claim 1, further comprising:
   a skew detecting mechanism that detects, at a predetermined detection point in a conveyance path, a skew of each of the first sheets and each of the second sheets with respect to the conveying direction; and
   a skew control mechanism that controls operation of the first precedent-stage conveyor mechanism, the second precedent-stage conveyor mechanism, or the subsequent-stage conveyor mechanism, based on the detected skew, and adjusts the skew of each of the first sheets and each of the second sheets.

9. A stacking apparatus comprising:
   N precedent-stage conveyor mechanisms each conveying one or more sheets, the N being an integer equal to or more than three;
   a merging mechanism that guides, to a merge point, the sheets output from each of the N precedent-stage conveyor mechanisms;
   a subsequent-stage conveyor mechanism that
      sequentially receives, at the merge point, each of the sheets conveyed by the N precedent-stage conveyor mechanisms, and
      conveys each of the sheets in order of the reception while lining up in a conveying direction;
   a stacking mechanism that
      sequentially catches each of the sheets conveyed by the subsequent-stage conveyor mechanism, and
      stacks, at a predetermined position, each of the caught sheets in order of the catch; and
   N supplying mechanisms that are provided correspondingly to the N precedent-stage conveyor mechanisms, each of the N supplying mechanisms sequentially outputting the sheets one by one to a corresponding precedent-stage conveyor mechanism,
   wherein each of the N supplying mechanisms outputs sheets belonging to a predetermined type, and is adjusted to output the sheets at timings that allow the sheets to arrive at the merge point in predetermined order.

10. A stacking method of stacking one or more first sheets and one or more second sheets by using a stacking apparatus, the stacking apparatus including:
    a first precedent-stage conveyor mechanism that conveys the first sheets;
    a second precedent-stage conveyor mechanism that conveys the second sheets;
    a subsequent-stage conveyor mechanism that sequentially receives each of the first sheets and each of the second sheets conveyed by the first precedent-stage conveyor mechanism and the second precedent-stage conveyor mechanism, respectively, and conveys each of the first sheets and each of the second sheets in order of the reception while lining up in a conveying direction;
    a stacking mechanism that sequentially catches each of the first sheets and each of the second sheets conveyed by the subsequent-stage conveyor mechanism, and stacks each of the first sheets and each of the second sheets at a predetermined position in order of the catch;
    a detecting mechanism that detects a condition of the first sheets and the second sheets which are being conveyed by the first precedent-stage conveyor mechanism, the second precedent-stage conveyor mechanism, and the subsequent-stage conveyor mechanism;
    a rejection control mechanism that detects a defective first sheet and a defective second sheet from among the first sheets and the second sheets based on the condition of the first sheets and the second sheets; and
    a rejecting mechanism that removes the defective first sheet and the defective second sheet at a downstream of the detecting mechanism in a conveyance path,
    the stacking method comprising
       feeding the first sheets and the second sheets from the first precedent-stage conveyor mechanism and the second precedent-stage conveyor mechanism to the subsequent-stage conveyor mechanism by a merging mechanism that guides, to a merge point, each of the first sheets output from the first precedent-stage conveyor mechanism and guides, to the merge point, each of the second sheets output from the second precedent-stage conveyor mechanism; and
       causing the rejecting mechanism to remove, in addition to the defective first sheet and the defective second sheet, another first sheet and another second sheet that are conveyed in a predetermined positional relation with the defective first sheet and the defective second sheet.

11. A stacking method of stacking one or more sheets by using a stacking apparatus, the stacking apparatus including:
    N precedent-stage conveyor mechanisms each conveying the sheets, the N being an integer equal to or more than three;
    a subsequent-stage conveyor mechanism that sequentially receives each of the sheets conveyed by the N precedent-stage conveyor mechanisms, and conveys each of the sheets in order of the reception while lining up in a conveying direction; and
    a stacking mechanism that sequentially catches each of the sheets conveyed by the subsequent-stage conveyor mechanism, and stacks each of the caught sheets at a predetermined position in order of the catch, the stacking method comprising:
       feeding the sheets from the N precedent-stage conveyor mechanisms to the subsequent-stage conveyor mechanism by a merging mechanism that guides, to a merge point, each of the sheets output from each the N precedent-stage conveyor mechanisms,
    wherein the stacking apparatus further incudes N supplying mechanisms that are provided correspondingly to the N precedent-stage conveyor mechanisms, each of the N supplying mechanisms sequentially outputting the sheets one by one to a corresponding precedent-stage conveyor mechanism, and the stacking method further comprises:

by each of the N supplying mechanisms, outputting sheets belonging to a predetermined type, wherein outputting the sheets is adjusted to be timings that allow the sheets to arrive at the merge point in predetermined order.

\* \* \* \* \*

UNITED STATES PATENT AND TRADEMARK OFFICE
CERTIFICATE OF CORRECTION

PATENT NO. : 11,708,232 B2
APPLICATION NO. : 17/004142
DATED : July 25, 2023
INVENTOR(S) : Yuko Kobayashi et al.

It is certified that error appears in the above-identified patent and that said Letters Patent is hereby corrected as shown below:

In the Claims

Claim 13, Column 19, Line 6, "to be timings" should read as --to be at timings--.

Signed and Sealed this
Fifth Day of March, 2024

Katherine Kelly Vidal
Director of the United States Patent and Trademark Office